United States Patent [19]
Lee et al.

[11] Patent Number: 5,702,647
[45] Date of Patent: Dec. 30, 1997

[54] MULTIPLE DOWNCOMER HIGH PERFORMANCE TRAY ASSEMBLY

[75] Inventors: Adam T. Lee, Richardson; Kuang Wu, Plano; Larry Burton, De Soto, all of Tex.

[73] Assignee: Koch Enterprises, Inc., Wichita, Kans.

[21] Appl. No.: 816,197

[22] Filed: Mar. 26, 1997

Related U.S. Application Data

[63] Continuation of Ser. No. 414,615, Mar. 31, 1995, abandoned.

[51] Int. Cl.$^6$ ............................................. B01F 3/04
[52] U.S. Cl. ............................ 261/114.5; 261/114.2; 261/114.1
[58] Field of Search ..................... 261/114.5, 114.4, 261/114.1, 114.2

[56] References Cited

U.S. PATENT DOCUMENTS

| | | | |
|---|---|---|---|
| 2,582,657 | 1/1952 | Semer | 261/114.5 |
| 2,582,826 | 1/1952 | Glitsch | 189/34 |
| 2,611,596 | 9/1952 | Glitsch | 261/114 |
| 2,693,949 | 11/1954 | Huggins | 261/114 |
| 2,757,915 | 8/1956 | Huggins | 261/114 |
| 2,762,692 | 9/1956 | Spitz et al. | 23/283 |
| 2,787,453 | 4/1957 | Hibshman et al. | 261/114 |
| 2,836,406 | 5/1958 | Nutter | 261/114.1 |
| 2,951,691 | 9/1960 | Nutter | 261/114 |
| 3,008,553 | 11/1961 | Glitsch et al. | 189/36 |
| 3,013,782 | 12/1961 | Glitsch | 261/114 |
| 3,079,134 | 2/1963 | Winn | 261/114 |
| 3,080,155 | 3/1963 | Glitsch et al. | 261/114 |
| 3,087,711 | 4/1963 | Glitsch | 261/114 |
| 3,125,614 | 3/1964 | Mayfield et al. | 261/114 |
| 3,233,708 | 2/1966 | Glitsch | 189/36 |
| 3,282,576 | 11/1966 | Bruckert et al. | 261/114 |
| 3,343,821 | 9/1967 | Winn et al. | 261/112 |
| 3,410,540 | 11/1968 | Bruckert | 261/113 |
| 3,463,464 | 8/1969 | Nutter et al. | 261/114.1 |
| 3,464,679 | 9/1969 | Becker | 261/114 |
| 3,467,365 | 9/1969 | Webster | 261/114 |
| 3,550,916 | 12/1970 | Hoppe et al. | 261/114 |
| 3,784,175 | 1/1974 | Hirao et al. | 261/114 |
| 3,959,419 | 5/1976 | Kitterman | 261/98 |
| 3,969,447 | 7/1976 | Glitsch et al. | 261/111 |
| 4,101,610 | 7/1978 | Kirkpatrick et al. | 261/110 |
| 4,120,919 | 10/1978 | McClain | 261/114.5 |
| 4,123,008 | 10/1978 | McClain | 239/568 |
| 4,133,852 | 1/1979 | DiNicolantonio et al. | 261/114.5 |
| 4,159,291 | 6/1979 | Bruckert et al. | 261/114.1 |

(List continued on next page.)

FOREIGN PATENT DOCUMENTS

| | | |
|---|---|---|
| 0 092 262 | 10/1983 | European Pat. Off. . |
| 23 05 564 | 8/1973 | Germany . |
| 2721 667 | 3/1978 | Germany . |
| 2835 462 | 2/1980 | Germany . |
| 510247 | 4/1976 | U.S.S.R. . |
| 997706 | 2/1983 | U.S.S.R. . |
| 1 422 131 | 1/1976 | United Kingdom . |
| 1 577 837 | 9/1976 | United Kingdom . |
| 2092175 | 8/1982 | United Kingdom . |

OTHER PUBLICATIONS

EP96302273, Dec. 20, 1996, European Search Report.
Chen, Gilbert K., "Packed Column Intervals", *Chemical Engineering*, Mar. 5, 1984, pp. 40–51.
Union Carbide Corporation, "Linde Multiple Downcomer Trays".
*Ballast Tray Design Manual*, Glitsch, Inc., Bulletin No. 4900, Fourth Edition, pp. 32–33.
*Ballast Tray Design Manual*, Glitsch, Inc.., Bulletin No. 4900, Fourth Edition.

*Primary Examiner*—Tim R. Miles
*Attorney, Agent, or Firm*—Jenkens & Gilchrist, P.C.

[57] ABSTRACT

A multiple downcomer tray assembly for vapor liquid contact towers. The downcomers are constructed with support baffles enabling the downcomer tray to be supported therefrom. The support baffles include a generally centralized aperture formed therethrough. An active bridge is disposed between adjacent, end to end downcomers for equalization of liquid flow upon the tray.

23 Claims, 3 Drawing Sheets

U.S. PATENT DOCUMENTS

| | | | |
|---|---|---|---|
| 4,174,363 | 11/1979 | Bruckert | 261/114.5 |
| 4,275,021 | 6/1981 | Kirkpatrick et al. | 261/114 JP |
| 4,499,035 | 2/1985 | Kirkpatrick et al. | 261/114 JP |
| 4,504,426 | 3/1985 | Chuang et al. | 261/114 R |
| 4,543,219 | 9/1985 | Yamato et al. | 261/109 |
| 4,550,000 | 10/1985 | Bentham | 261/114 R |
| 4,597,916 | 7/1986 | Chen | 261/94 |
| 4,601,788 | 7/1986 | Bannon | 202/153 |
| 4,603,022 | 7/1986 | Yoneda et al. | 261/114 R |
| 4,604,247 | 8/1986 | Chen et al. | 261/94 |
| 4,623,493 | 11/1986 | Bentham | 261/109 |
| 4,627,941 | 12/1986 | Bentham | 261/109 |
| 4,729,857 | 3/1988 | Lee et al. | 261/97 |
| 4,820,456 | 4/1989 | Kiselev | 261/111 |
| 4,838,906 | 6/1989 | Kiselev | 55/238 |
| 4,842,778 | 6/1989 | Chen et al. | 261/97 |
| 4,908,051 | 3/1990 | Kiselev | 55/457 |
| 4,909,967 | 3/1990 | Binkley et al. | 261/97 |
| 4,956,127 | 9/1990 | Binkley et al. | 261/114.1 |
| 5,047,179 | 9/1991 | Nye | 261/114.1 |
| 5,049,319 | 9/1991 | Nye | 261/114.1 |
| 5,098,615 | 3/1992 | Resetarits | 261/114.1 |
| 5,164,125 | 11/1992 | Binkley et al. | 261/114.1 |
| 5,192,466 | 3/1993 | Binkley | 261/114.3 |
| 5,223,183 | 6/1993 | Monkelbaan et al. | 261/114.1 |
| 5,244,604 | 9/1993 | Miller et al. | 261/97 |
| 5,318,732 | 6/1994 | Monkelbaan et al. | 261/114.1 |
| 5,382,390 | 1/1995 | Resetarits et al. | 261/114.3 |
| 5,454,989 | 10/1995 | Nutter | 261/114.5 |

MULTIPLE DOWNCOMER HIGH PERFORMANCE TRAY ASSEMBLY

This is a continuation of application Ser. No. 08/414,615, filed Mar. 31, 1995 now abandoned.

BACKGROUND OF THE INVENTION

1. Field of the Invention

The present invention pertains to gas-liquid contacting towers and, more particularly, to an improved multiple downcomer-tray assembly incorporating downcomer support baffles and an active bridge between adjacent downcomers.

2. History of the Prior Art

Distillation columns are utilized to separate selected components from a multicomponent stream. Generally, such gas-liquid contact columns utilize either trays, packing or combinations of each. In recent years the trend has been to replace the so-called "bubble caps" by sieve and valve trays in most tray column designs. Additionally, random (dumped) or structured packings have been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high efficiency packing, has also become popular for certain applications. Such packing is energy efficient because it has low pressure drop and low liquid hold-up. However, these very properties at times make columns equipped with structured packing difficult to operate in a stable, consistent manner. Moreover, many applications simply require the use of trays.

Fractionation column trays generally come in one of two configurations: cross-flow and counter flow. The trays generally consist of a solid tray or deck having a plurality of apertures and are installed on support rings within the tower. In cross-flow trays, vapor ascends through the apertures and contacts the liquid moving across the tray through the "active" area thereof. In the active area, liquid and vapor mix and fractionation occurs. The liquid is directed onto a tray area active for vapor-liquid contact. For example, the area under the Inlet Downcomer is generally a solid region. To attempt to gain more area of the tray for vapor/liquid contact, downcomers are often sloped. The maximum vapor/liquid handling capacity of the tray generally increases with an increase in the active or Bubbling Area. There is, however, a limit as to how far one can slope the downcomer (s) in order to increase the Bubbling Area without the channel becoming too small. This can restrict the flow of the liquid and/or restrict the disengagement of vapor retained in the liquid, cause liquid to back up in the downcomer, and thus prematurely limit the normal maximum vapor/liquid handling capacity of the tray.

A variation for increasing the Bubbling Area and hence vapor/liquid handling capacity is a multiple downcomer tray. There are usually many box shaped vertical channels installed in a symmetrical pattern across the tray to direct liquid onto and off of the tray. The downcomers do not extend all the way to the tray below but stop short of the tray by a predetermined distance which is limited by a sufficient space to permit disengagement of any vapor retained in the liquid entering the Exit Downcomer. The downcomer pattern may be rotated 90 or 180 degrees between successive trays. The bottoms of the boxes are solid except for slots that direct the liquid onto the Bubbling Area of the tray below, in between the outlet downcomers of the tray. The multiple downcomer tray falls into the category of Multipass Trays and is usually used for high liquid rates. A critical feature in such trays is the available active area of the tray. Designs for increasing this active area are thus of major import in tray fabrication.

Various techniques have been developed for increasing the tray active area in process column designs. For example, U.S. Pat. No. 4,956,127, assigned to the assignee of the present invention, illustrates a tray design with a raised active area disposed beneath the downcomer inlet for increasing the active area of the tray. U.S. Pat. No. 5,164,125, also assigned to the assignee of the present invention, again addresses a downcomer-tray assembly for vapor liquid contact towers featuring improved downcomer and tray designs for enhancing the active area of the tray as well as the balance of liquid flow thereon. The balance of liquid flow is of primary significance in such trays. As set forth in U.S. Pat. No. 5,192,466, also assigned to the assignee of the present invention, methods of and apparatus for flow promotion and effective balance of flow upon a tray are important design features. When flow is uneven or stagnated, the efficiency of the chemical process column is drastically reduced. For this reason, these and other innovations in the downcomer-tray area have received considerable attention.

In addition to the above, the technology of gas-liquid contact addresses many other performance issues. Examples are seen in several prior art patents, which include U.S. Pat. Nos. 3,959,419, 4,604,247 and 4,597,916, each assigned to the assignee of the present invention, and U.S. Pat. No. 4,603,022 issued to Mitsubishi Jukogyo Kabushiki Kaisha of Tokyo, Japan. A particularly relevant reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating vapor ascension therethrough.

U.S. Pat. No. 4,550,000 assigned to Shell Oil Company teaches apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings mounted to the top of the tray deck beneath the downcomers for breaking up the descending liquid flow. Such advances improve tray efficiency within the confines of prior art structures. Likewise, U.S. Pat. No. 4,543,219 assigned to Nippon Kayaku Kabushiki Kaisha of Tokyo, Japan teaches a baffle tray tower. The operational parameters of high gas-liquid contact efficiency and the need for low pressure loss are set forth. Such references are useful in illustrating the need for high efficiency vapor liquid contact in tray process towers. U.S. Pat. No. 4,504,426 issued to Carl T. Chuang et. al. and assigned to Atomic Energy of Canada Limited is yet another example of gas-liquid contacting apparatus. This reference likewise teaches the multitude of advantages in improving efficiency in fractionation and modifications in downcomer-tray designs.

The perforated area of the tray is extended beneath the downcomer with between 0 to 25% less perforation area.

Yet another reference is seen in U.S. Pat. No. 3,410,540 issued to W. Bruckert in 1968. A downcomer outlet baffle is therein shown to control the discharge of liquid therefrom. The baffle may include either a static seal or dynamic seal. In this regard the openings from the downcomer are sufficiently small to control discharge and may be larger than the tray perforations and of circular or rectangular shape. The transient forces which may disrupt the operation of a downcomer are also more fully elaborated therein. These forces and related vapor-liquid flow problems must be considered for each application in which a downcomer feeds an underlying tray.

Yet a further reference addressing downcomer tray assemblies and methods of mixing vapor with liquid from a discharge area of a downcomer is set forth and shown in U.S. Pat. No. 4,956,127 (the '127 Patent) assigned to the assignee of the present invention. In the '127 Patent, a raised active inlet area is set forth and shown, which inlet area is provided for the venting of vapor from the tray therebeneath. The raised inlet area reduces fluid pressure of the vapor to facilitate the flow of ascending vapor therethrough. A series of louvers disposed on the raised active inlet area selectively directs the upward flow of vapor into the liquid region below the downcomer to generate more efficient vapor liquid contact and reduced back mixing across the tray. The discharge of liquid from the downcomer onto the raised active inlet area, though effective, has been shown to result in weeping as the discharged liquid from the downcomer passes through the apertures of the active inlet area. Additionally, the liquid splashing outwardly from the downcomer increases the frothiness thereof and causes liquid drops to be more easily suspended.

As set forth above, the effectiveness of downcomer-tray operation is directly related to fluid flow configurations. When downcomer weirs and other structural aspects of the tray inhibit either vapor or liquid flow, tower efficiency is reduced. In multiple downcomer tray assemblies, the tray decks are literally divided by the downcomer. This tray division can result in unequal flow on opposite sides of the downcomer. Likewise, structural members, such as support beams disposed under tray areas, can interfere with ascending vapor flow. Other structural members such as tray hold down and securement devices often disposed on tray perimeters may likewise present solid, non-active tray areas which prevent vapor flow. Such inactive, solid areas reduce tray efficiency as described above. It would be an advantage therefore to provide a multiple downcomer tray assembly addressing the problems of both liquid and vapor flow uniformity with multiple downcomer trays in a configuration which maximizes the active area of the tray and simplifies certain structural aspects therein to maximize the efficiency thereof.

Such a multiple downcomer tray assembly is provided by the present invention wherein a structural baffle system supports the downcomers, positioning them above a tray area active therebelow. The absence of structural support beams beneath the tray deck, which is facilitated by the support of the downcomer and tray by the baffle support system, eliminates interference with ascending vapor flow to improve the efficiency of the column. The baffle support is further constructed in such a manner as to permit liquid flow thereacross for liquid flow equalization upon the tray.

SUMMARY OF THE INVENTION

The present invention pertains to multiple downcomer tray assemblies for chemical process columns. More particularly, one aspect of the invention includes a multiple downcomer tray assembly for a process column of the type wherein liquid flows downwardly from a first tray through first downcomers onto a second tray and across the active area or areas thereof. Across these active tray areas vapor flows upwardly for interaction and mass transfer with the liquid. The liquid then passes from the trays through downcomers. The present invention permits the downcomers of the first and second trays to be oriented generally parallel one to the other with a plurality thereof supported by baffles extending therealong. The baffles are connected to the downcomers by a plurality of angulated support members secured at one end to the baffle and at a second end to the tray-downcomer region. The trays are further supported by a tower support ring extending circumferentially therearound.

In another aspect, the invention relates to a multiple downcomer tray assembly for a chemical process column of the type wherein liquid flows downwardly and vapor flows upwardly in interaction therewith and wherein liquid flows upon a first tray and downwardly from the first tray through a first series of downcomers disposed therein onto a second tray and thereupon adjacent a second series of downcomers disposed therein. The invention comprises the first and second downcomers being oriented generally parallel one to the other (in one embodiment) with a plurality of support baffles extending along at least some of the downcomers for the support thereof. A plurality of mounting members secure the downcomers to the support baffles and at least two downcomers are disposed in spaced, end to end relationship within one of the trays facilitating an active tray bridge section disposed between the ends thereof. This construction permits ascending vapor flow through the bridge, which increases the tray active area. The trays are further supported by a tower support ring extending circumferentially therearound.

In another aspect, the above described invention further includes a single, continuous support baffle which extends along the end to end downcomers in support thereof and includes an open intermediate region thereof that is open for receiving the bridge section therethrough and facilitating liquid flow thereacross for equalization of liquid flow upon the tray. The bridge is formed with a plurality of apertures for facilitating the ascending flow of vapor therethrough and to further increase the active region of the tray. The mounting members comprise plates secured at a first end to the baffle and at a second end to the downcomer. In one embodiment, the downcomer includes a weir secured thereto and the connection member may be secured at the second end to the weir. The connection member may comprise a channel having a width of sufficient size to form a liquid deflector plate relative to the downcomer tray area.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figures 1, 4, 6:
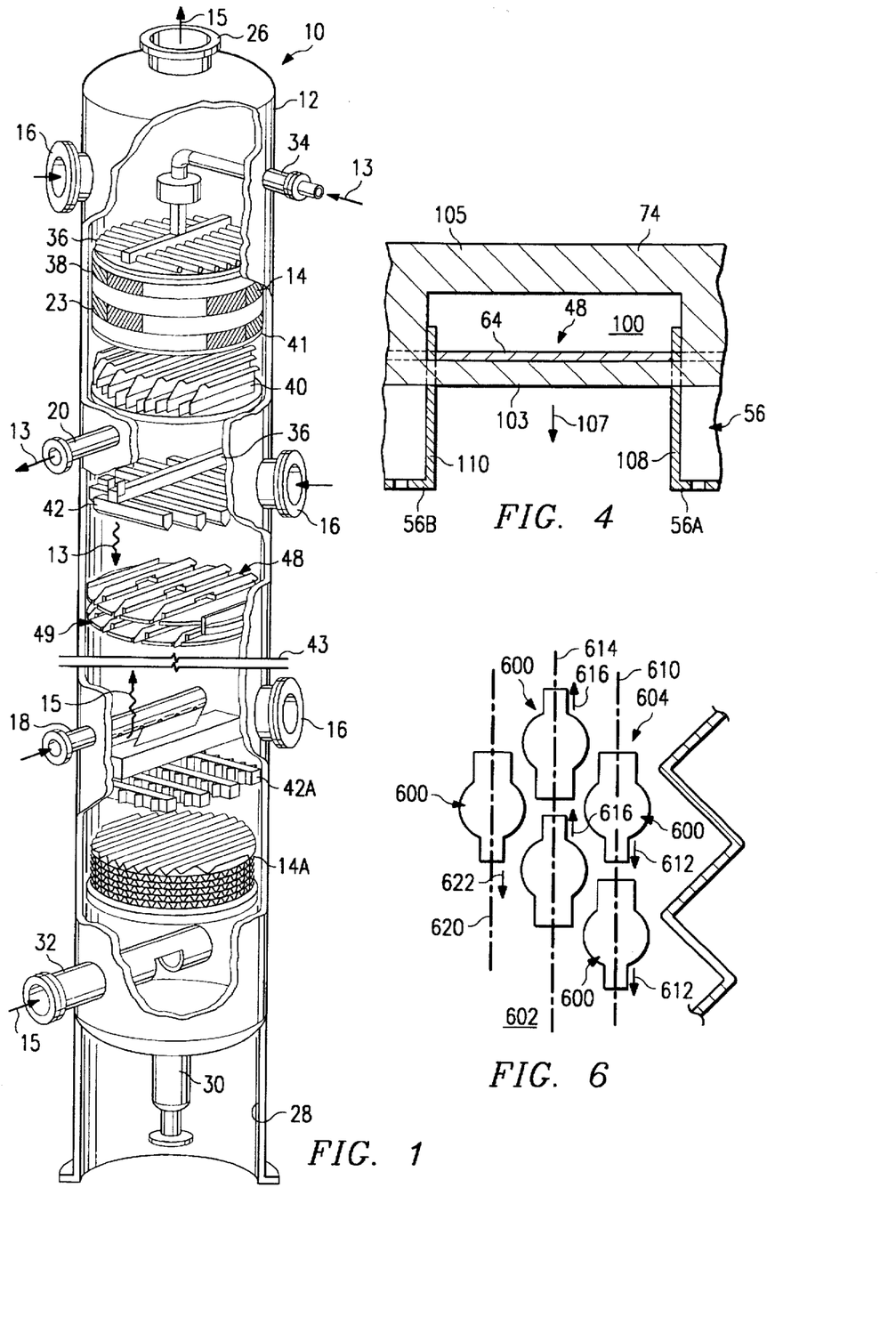
FIG. 1 is a perspective view of a packed column with various sections cut away for illustrating a variety of tower internals and one embodiment of a downcomer tray assembly constructed in accordance with the principles of the present invention disposed therein.
FIG. 4 is an enlarged, side elevational view of the downcomer of FIG. 3 taken along lines 4—4 thereof.
FIG. 6 is a top plan view of an alternative embodiment of a portion of the tray of FIG. 2.

Referring first to FIG. 1; there is shown a fragmentary, perspective view of an illustrative packed exchange tower or column with various sections cut away for showing a variety of tower internals and the utilization of one embodiment of the tray assembly of the present invention. The exchange column 10 of FIG. 1 comprises a cylindrical tower 12 having a plurality of packing bed layers 14 and trays disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 12.

In operation, liquid 13 is fed into the tower 12 through reflux return line 34 and side stream input feed line 18. The liquid 13 flows downwardly through the tower 12 and ultimately leaves the tower 12 either at side stream draw off line 20, or at bottom stream draw off line 30. In its downward flow, the liquid 13 is depleted of some material which evaporates from it as it passes through the trays and packing beds, and is enriched or added to by material which condenses into it out of the vapor stream. Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the 12 tower around bottom stream draw off line 30 coupled to a reboiler (not shown). Reboiler return line 32 is shown disposed above the skirt 28 for recycling vapor therein upwardly through the trays and/or packing layers 14. Reflux from condensers is provided in the upper tower region 23 through reflux return line 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing bed 38. A liquid distributor 42, adapted for redistributing liquid 13, is likewise disposed therebeneath. A second type of distributor 42A is shown below the cut-line 43 and disposed above bed-structured packing 14A. The column 10 is presented with cut-line 43 for illustrating the fact that the tower internals arrangement is diagrammatic only and is provided for referencing various component arrays therein.

Referring still to FIG. 1, both structured packing and tower trays are shown in this view for purposes of illustration. In many instances, process columns contain only packing, only trays, or selective combinations of packing and trays. The present illustration is a combination thereof for purposes of discussion of the overall tower and its operation. Process column trays generally comprise plates which are perforated or slotted in construction. The vapor and the liquid engage at or along the tray and, in some assemblies, are permitted to flow through the same openings in a counter-current flow arrangement. Optimally, the vapor and liquid flows reach a level of stability. In some embodiments no downcomers are used and the vapor and the liquid use the same openings, alternating as the respective pressures change. But such is not the case herein.

In the present embodiment, downcomer trays 48 and 49 having multiple downcomers are illustrated. Tray 48 incorporates an active surface between downcomers. The type of surface will be discussed below. Likewise, tray 49 includes an active surface between downcomers and active inlet areas disposed beneath the multiple downcomers thereabove. A more complete description of this section of the tower, which comprises the present invention, will be set forth below. The anatomy of process columns in general is likewise described in more detail in an article by Gilbert Chen, entitled "Packed Column Internals" appearing in the Mar. 5, 1984 edition of *Chemical Engineering*, incorporated herein by reference.

Figure 2:
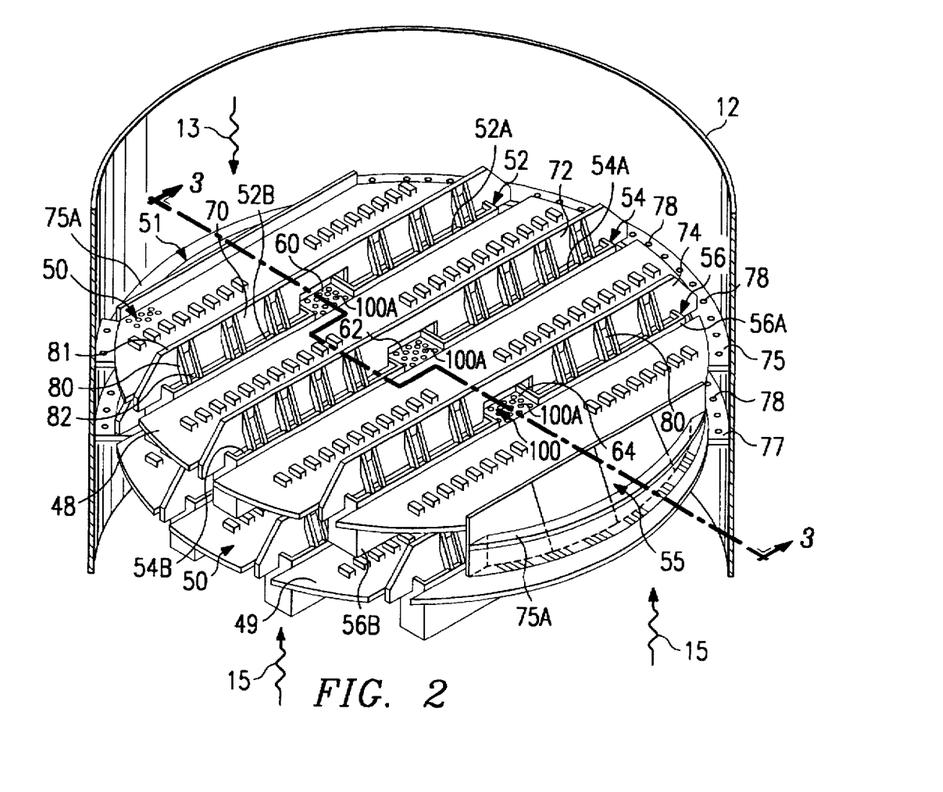
FIG. 2 is a perspective view of a downcomer-tray assembly constructed in accordance with the principles of the present invention.

Referring now to FIG. 2, there is shown an enlarged perspective view of the trays 48 and 49 schematically shown in FIG. 1. The remaining portions of the column are not shown for purposes of clarity. Upper tray 48 is constructed with an active tray surface 50 that has been separated by two side downcomers 51 and 55 and three intermediate downcomer arrays 52, 54, and 56. The side downcomers 51 and 55 will be discussed below. Each downcomer array 52, 54, 56 is made up of a pair of downcomers positioned in spaced end to end relationship. Downcomer array 52 thus comprises downcomer 52A in spaced end to end relationship with downcomer 52B. Downcomer array 54, likewise, is comprised of downcomer 54A in spaced end to end relationship with downcomer 54B. Downcomer array 56 is comprised of downcomer 56A in disposed and ended relationship with downcomer 56B. The spaced end to end relationship between said downcomers permits an active bridge to be placed therebetween. Downcomer array 52 thus includes active bridge 60 while downcomer array 54 includes bridge 62. A bridge 64 is disposed in downcomer array 56. In this manner, liquid 13 along any portion of the tray 48 will be allowed to equalize across the tray surface 50 by the presence of the bridges 60, 62 and 64.

As referenced above, the upper tray 48 is constructed with active tray surface 50 (partially and diagrammatically shown). The active surface 50 may be formed with one or more of a variety of valve types. Representative valve types for such applications are set forth and shown in U.S. Pat. No. 5,120,474, assigned to the assignee of the present invention and incorporated herein by reference.

Referring still to FIG. 2 the present invention further includes an improved support system incorporating baffles for the intermediate downcomer-tray support. A support baffle 70 is thus shown to extend the length of downcomer array 52 while support baffle 72 extends the length of downcomer array 54. Support baffle 74 extends the length of downcomer array 56 in support of the downcomer tray region therebeneath. Each of the support baffles 70, 72, and 74 is connected at opposite ends to the tower 12 and then connected to the respective downcomer-tray region by a plurality of support members 80 which are connected at a first end 81 to the support baffle and at a second end 82 to the downcomer tray region. This construction eliminates the need for underlying support beams for the tray and provides improved flow efficiency.

Referring still to FIG. 2 tray 49 is constructed as described above with the downcomer arrays thereof disposed beneath the active tray areas 50 of tray 48. As will be described in more detail below, the active areas beneath the downcomers of the present invention may include a raised active inlet area for enhancing the vapor liquid contact therein. As shown in FIG. 2, the downcomers of tray 49 are disposed in generally parallel spaced relationship relative to the downcomers of tray 48 as well as being laterally offset therebetween.

Figure 3:
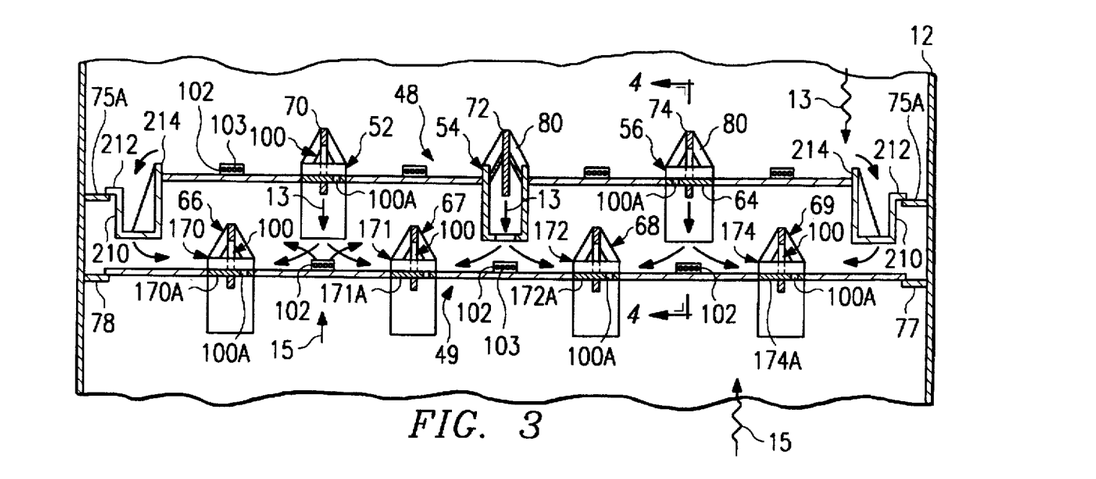
FIG. 3 is a diagrammatic, cross-sectional view of the improved downcomer tray assembly of FIG. 2, taken along lines 3—3 thereof.

Referring now to FIG. 3, there is shown a side-elevational, cross-sectional, diagrammatic view of several aspects of the present invention. As shown herein, liquid 13 flows downwardly from first tray 48 over weirs 214 through side downcomers 51 and 55 and through first intermediate downcomers-arrays 52, 54 and 56 onto second tray 49 adjacent a second series of intermediate downcomer-arrays 66, 67, 68, and 69. Said downcomer-arrays of tray 49 are preferably constructed in similar fashion to the downcomer-arrays of tray 48 as described above. The first and second downcomer-arrays are oriented generally parallel one to the other and a plurality thereof are supported by the baffle support structure described above extending therealong. In that regard, baffles 170, 171, 172 and 174 of tray 49 are connected to the underlying downcomer-tray region through the plurality of angulated members 80, which are described above. Each member 80 is secured at top end 81 to the respective baffle and at the second, opposite end 82 to the respective tray-downcomer region. The trays 48 and 49 are further supported along their outer perimeter by tower support rings 75 and 77 extending circumferentially therearound. As seen in FIG. 2, the rings 75 and 77 may have formed therein apertures 78 for facilitating the ascending flow of vapor 15 therethrough, as set forth and claimed in co-pending patent application Ser. No. 08/414,792 filed concurrently herewith, now U.S. Pat. No. 5,547,617, assigned to the assignee of the present invention and incorporated herein by reference. The apertures 78 formed in the support rings 75 and 77 comprise, in one embodiment, valves disposed therein for facilitating the flow of vapor 15 therethrough for increasing the effective active area 50 of the tray. In FIG. 3, a solid support ring 75A is provided for the side downcomers 51 and 55.

Referring still to FIG. 3, the diagrammatic schematic representation of the multiple downcomer tray assembly shown therein illustrates methods of, and apparatus for, maximizing structural and functional aspects of the process tower assembly. The material and techniques for the fabrication of such elements as described herein are well known within the industry. Actual steel sizes, welds and/or related fasteners are thus not shown in that the gauge of the steel and related steel construction techniques will depend upon the size of the tower 12.

The description of the present invention includes certain features which are only partially shown in FIG. 3, and which are described in more detail below. These features include the flow equalization bridges 60, 62 (not shown), and 64 disposed across those downcomer arrays 52, 54, and 56 (described above) which are positioned in intermediate areas of the tray 48. The side downcomers 51 and 55 do not require this feature. The intermediate downcomer-arrays 66, 67, 68 and 69 of tray 49 are thus diagrammatically shown with bridge sections 170A, 171A, 172A and 174A, respectively, formed therein. Said bridge sections are formed across said respective downcomer-arrays through an opening 100 of the respective supporting baffle. Opening 100 may be seen more clearly in the perspective view FIG. 2. By providing an opening 100 through the respective baffle, liquid 13 flowing upon the trays 48 and 49 may flow therethrough while maintaining the structural integrity of the tray system. As described above, with regard to tray 49, the bridges 170A, 171A, 172A and 174A are each formed with a plurality of apertures 100A therein for facilitating the ascending flow of vapor 15 therethrough and to further increase the active region of the respective tray. The apertures 100A are also best seen in the perspective view of FIG. 2.

Still referring to FIG. 3, the trays 48 and 49 may also be constructed with raised active inlet areas disposed beneath the downcomer of the above tray. The raised active inlet areas in the present embodiment include portions of the respective tray floor which are raised into venting chambers 102 having apertures 103 formed in the side walls thereof for providing a means for direct passage of vapor 15 ascending through the tower 12. The methods of and apparatus for the utilization of the vapor venting chambers 102 as shown herein is more fully set forth and described in U.S. patent application Ser. No. 08/306,672 (issued as U.S. Pat. No. 5,453,222 on Sep. 26, 1995) assigned to the Assignee of the present invention and incorporated herein in its entirety, by reference. By utilizing the vapor venting chambers 102, the liquid 13 descending downwardly from the respective downcomers is met immediately with ascending vapor 15 passing through the apertures 103 of chambers 102. As shown by the flow arrows of FIG. 3 disposed beneath downcomer 52, the present invention provides direct interaction between the counter current flows of vapor and liquid within the tower 12 while maximizing the flow efficiency thereof.

Referring now to FIG. 4 there is shown an enlarged, fragmentary side elevational, cross sectional view of a portion of the downcomer/support baffle of tray 48 of FIG. 3 taken along lines 4—4 thereof. Opening 100 is clearly shown disposed above the bridge section 64 of tray 48 forming a generally rectangular window through support baffle 74 of downcomer-array 56. The size of the opening 100 leaves intact elongate lower section 103 of support baffle 74. Structurally, this window configuration results in the lower section 103 providing structural integrity, being in tension while upper section 105 is in compression from a mechanical loading standpoint. Loading is schematically represented by arrow 107 representing the weight of the tray, downcomers and liquid present thereon during the operation of the tower 12. With such loading, it is preferable to provide support for the bridge 64 of tray 48 by the lower section 103. It is for this reason that the opening 100 is not simply a U-shaped cutout formed within the baffle 74. However, because of the structural configuration shown, the baffle 74 extends through the end walls 108 and 110 of end-to-end downcomers 56A and 56B, respectively, of downcomer-array 56. Standard fabrication and field assembly techniques such as welding and the like are utilized to secure the downcomer and support baffle configurations.

Figure 5:
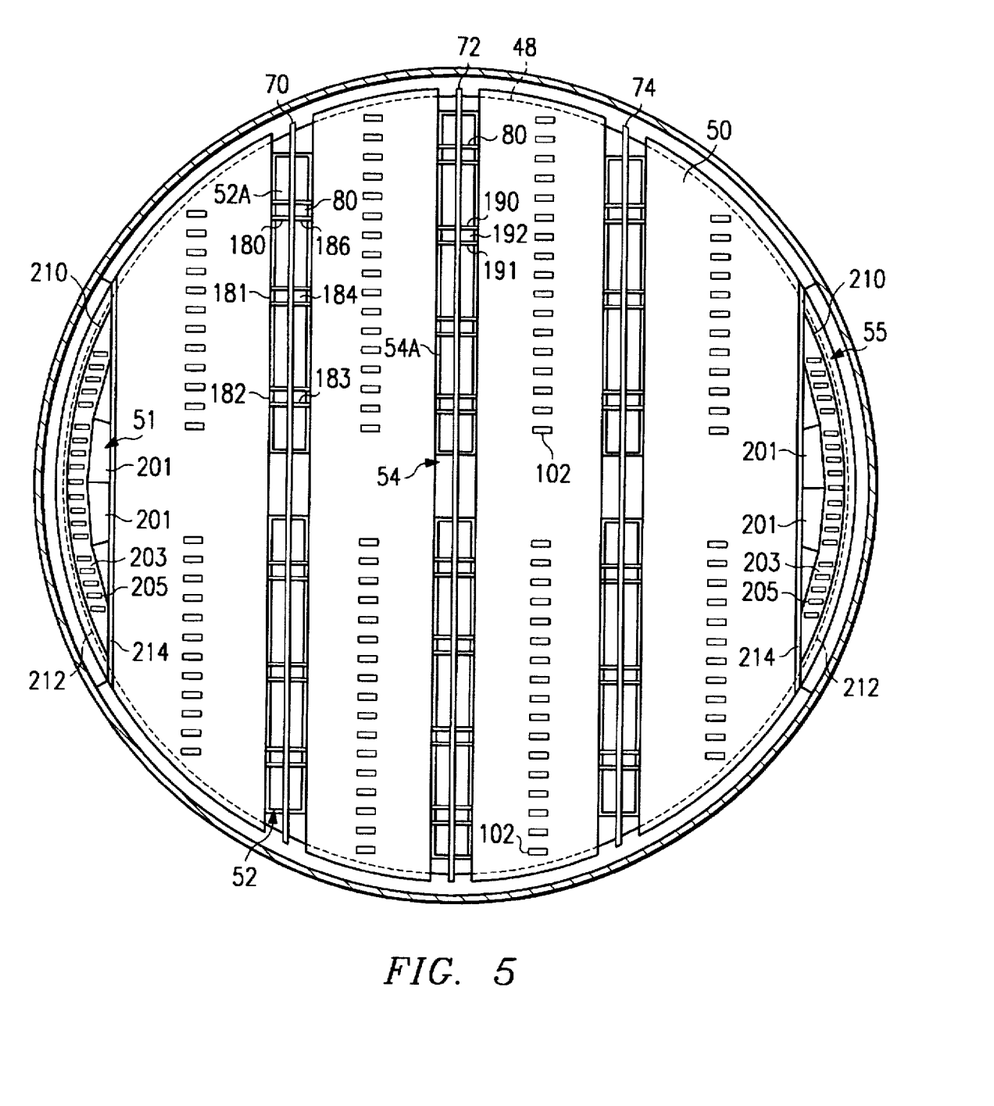
FIG. 5 is an enlarged top plan view of the downcomer-tray assembly of FIG. 2.

Referring now to FIG. 5 there is shown a top plan view of the tray 48 of FIG. 2 including the active tray section 50 and another illustration of the support baffles 70, 72, and 74. Each of said support baffles is connected by a series of connection members 80 to the respective downcomer-tray region therebeneath. The support baffle 70, for example, is constructed with six angulated connection members 180, 181, 182, 183, 184, and 186 connected to downcomer 52A of downcomer-array 52. Although six connection members 80 are shown for this particular section of the tray 48, the number will vary depending on the area of said tray, the structural loading for a particular tower and the relative weir lengths, as described below with regard to FIG. 6. For example, baffle 72 of downcomer 54A of downcomer-array 54 is constructed with eight connection members 80 due to the wider expanse thereof compared to downcomer 52A.

Referring still to FIG. 5 the raised active inlet areas (vapor venting chambers 102) between the downcomers are clearly shown. It is in this region that the downcomer from the tray above would be positioned to discharge liquid onto the active area 50 of tray 48. The connection members 80 are also constructed to address such liquid flow issues. It may be seen that each of the connection members 80 is formed with side walls 190 and 191 upstanding from an intermediate web region 192. It is the web region 192 that provides an angulated baffle for liquid which may otherwise splash into the respective downcomers. The connection members 80 are thus preferably formed of generally U-shaped channel members as shown in FIG. 2.

Referring still to FIG. 5 the side downcomers 51 and 55 are more clearly shown at least partially. Each side downcomer 51 and 55 is constructed with flat, angulated side wall sections 201 which terminate in a flat bottom section 203. The bottom 203 is constructed with a plurality of apertures 205 selectively arranged to distribute the liquid downwardly in a controlled configuration. This particular downcomer configuration is more clearly set forth and shown in U.S. Pat. No. 5,164,125, assigned to the assignee of the present invention and incorporated herein by reference. What is not shown in the aforesaid referenced patent is the outside wall supporting configuration of the downcomers 51 and 55 as shown herein. Referring back to FIG. 3, and addressing same in combination with FIG. 5, it may be seen that the outside walls 210 of said downcomers are constructed with a support flange 212 which extends outwardly therefrom in overlapping engagement with the support ring 75. The support flange 212 is also stepped downwardly (as seen in FIG. 3) from the level of the tray 48. This stepped or "funnel" region allows liquid flow over the top of the weirs 214 into an area larger than the cross sectional width of the respective downcomer. It is in this manner that the side downcomers 51 and 55 can accommodate more liquid flow by preventing choking which may occur without the enlarged or "funnel" effect of the present invention.

Referring now to FIG. 6 there is shown an enlarged top plan view of an alternative embodiment of a portion of the active area of the tray of FIG. 2. In this particular view, it may be seen that the present invention comprises a directional flow valve array disposed within the active area of the tray deck in a select orientation. The flow valves 600 are of the directional flow variety and are disposed in the active area 602 of tray deck 604 in a pattern calculated to cause increased liquid turbulence and mixing along the tray surface area. Each of the valves 600 along a first phantom line 610 are positioned to discharge vapor in a direction represented by arrows 612 while the valves along phantom line 614 are oriented to discharge more vapor in the direction of arrows 616. Valves 600 of phantom line 620 discharge more vapor in the direction of arrow 622. Each of the valves are constructed to discharge vapor in both directions but with one direction being preferential and resulting in greater vapor flow therein. Such valves are often referred to as directional flow valves. By orienting the valves as herein described, the liquid flowing thereover will have imparted thereto a thrust component perpendicular to the normal liquid flow thereby causing it to turn and twist in its movement from the downcomer discharge area to the particular downcomer weir adjacent thereto. This step increases the distance, or length of flows of the fluid traveling thereover. With the utilization of multiple downcomers in a single tray, the space between adjacent downcomers will be reduced. With reduced spacing, less "direct" travel distance is available for the liquid flow between the inlet area and the egressing downcomer weir. For this reason, increasing the length of flow over the active area is a distinct advantage which the present invention affords.

Still referring to FIG. 6, a weir 650 is shown adjacent valves 600 and constructed in a zig-zag configuration 652. The zig-zag configuration 652 is formed of a plurality of weir sections 654 and 656 forming apexes 658 therebetween. This zig-zag configuration increases the length of the weir relative to the active area 602. One parameter of flow distribution and tower efficiency includes the relationship between weir lengths and other parameters of the tray. By varying the weir shape, adjustments in length may be easily afforded without substantial modifications to the tray or downcomer area. This aspect of an adjustable weir length is likewise an asset when utilizing multiple downcomers within a single tray due to the fact that the downcomers may be disposed in side or chordal regions of the tray where the differences between the linear openings adjacent opposing downcomers can be substantial. In such configurations it is an advantage to be able to generally equalize the weir length in conjunction with the other vapor and liquid flow considerations to maximize tower efficiency and balance flow parameters therein in accordance with established vapor liquid contact tower operating procedures. The present invention provides such an advantage as herein set forth. In particular with the combination of the adjustable weir length and transverse directional flow valves with the oppositely oriented pattern above described, the efficiency of operation of the active area of the tray is greatly increased.

It is thus believed that the operation and construction of the present invention will be apparent from the foregoing description. While the method and apparatus shown or described has been characterized as being preferred, it will be obvious that various changes and modifications may be made therein without departing from the spirit and scope of the invention as defined in the following claims.

We claim:

1. A multiple downcomer-tray assembly for a vapor-liquid contact chemical process column of the type wherein said trays are formed with active regions thereon for the ascending flow of vapor therethrough and wherein liquid is directed to flow upon a first tray and downwardly therefrom through a first series of downcomers disposed therein onto a second tray and across active regions thereof between individual ones of a second series of downcomers disposed therein, said assembly further comprising:

a plurality of support baffles secured to said column and extending along certain ones of said downcomers for the support thereof;

a plurality of mounting members securing said downcomers to said support baffles;

at least two downcomers being disposed in spaced, end to end relationship within one of said trays; and an active tray bridge section being disposed between said ends of said end to end downcomers for permitting liquid flow thereacross and ascending vapor flow therethrough.

2. The apparatus as set forth in claim 1 wherein said trays are secured to said downcomers and also supported along intermediate regions thereof by said support baffles.

3. The apparatus as set forth in claim 1 wherein said trays are outwardly supported by a column support ring extending circumferentially therearound.

4. The apparatus as set forth in claim 1 wherein a single support baffle extends continuously along said end to end downcomers in support thereof and includes an open, intermediate region thereof adapted for receiving said bridge section therethrough and facilitating liquid flow thereacross for equalization of liquid flow upon said tray adjacent thereto.

5. The apparatus as set forth in claim 1 wherein some of said regions of said second tray disposed beneath said first series of downcomers of said first tray are constructed with vapor riser tunnels therein to facilitate the ascending flow of vapor therethrough.

6. The apparatus as set forth in claim 1 wherein said active regions of said tray are formed with vapor valves therein for facilitating the ascending flow of vapor therethrough.

7. The apparatus as set forth in claim 6 wherein said bridge is formed with a plurality of vapor valves therein for facilitating the ascending flow of vapor therethrough and to further increase the active region of said tray.

8. The apparatus as set forth in claim 6 wherein said vapor valves comprise fixed valves.

9. The apparatus as set forth in claim 6 wherein said vapor valves comprise floating valves.

10. The apparatus as set forth in claim 1 wherein said mounting members comprise plates secured at a first end to said baffle and at a second end to said downcomer.

11. The apparatus as set forth in claim 10 wherein said downcomer further includes a weir secured thereto and wherein said connection member is secured at said second end to said weir.

12. The apparatus as set forth in claim 10 wherein said connection member comprises a channel having a width of sufficient size to form a liquid deflector plate relative to said downcomer.

13. The apparatus as set forth in claim 10 wherein said mounting members are welded to said baffle and said downcomer.

14. The apparatus as set forth in claim 10 wherein said first and second downcomers are oriented generally parallel one to the other.

15. In a chemical process column of the type wherein liquid flows downwardly and vapor ascends upwardly through mixing regions thereof, a downcomer tray assembly incorporating multiple downcomers therein, said assembly comprising:

a first tray having a first series of downcomers disposed therein;

a second tray disposed beneath said first tray and having a second series of downcomers disposed therein;

said trays being formed with active regions thereon for the ascending flow of vapor therethrough;

a plurality of support baffles secured to said columns and extending across said first and second trays along select ones of said downcomers;

means connecting said downcomer-tray assemblies to said support baffles; and means for supporting the perimeter of said trays relative to said support baffles; and wherein at least two downcomers of said first tray are disposed in spaced, end to end relationship and wherein an active tray bridge is disposed between said ends of said end to end downcomers for permitting liquid flow thereacross.

16. The apparatus as set forth in claim 15 wherein a single support baffle extends continuously along said end to end downcomers in support thereof and includes an open, intermediate region thereof adapted for receiving said bridge therethrough and facilitating liquid flow thereacross for equalization of liquid flow upon said tray adjacent thereto.

17. The apparatus as set forth in claim 15 wherein said active regions of said tray are formed with vapor valves therein for facilitating the ascending flow of vapor therethrough.

18. The apparatus as set forth in claim 17 wherein said bridge is formed with a plurality of vapor valves therein for facilitating the ascending flow of vapor therethrough and to further increase the active region of said tray.

19. The apparatus as set forth in claim 17 wherein said vapor valves comprise fixed valves.

20. The apparatus as set forth in claim 17 wherein said vapor valves comprise floating valves.

21. In a chemical process column of the type wherein liquid flows downwardly and vapor ascends upwardly through mixing regions thereof, a downcomer tray assembly incorporating multiple downcomers therein, said assembly comprising:

a first tray having a first series of downcomers disposed therein;

a second tray disposed beneath said first tray and having a second series of downcomers disposed therein;

said trays being formed with active regions thereon for the ascending flow of vapor therethrough;

a plurality of support baffles secured to said columns and extending across said first and second trays along select ones of said downcomers;

means connecting said downcomer-tray assemblies to said support baffles;

means for supporting the perimeter of said trays relative to said support baffles; and wherein said means for connecting comprises a connection member secured at a first end to said baffle and at a second end to said downcomer, and said connection member comprises a channel having a width of sufficient size to form a liquid deflector plate relative to said downcomer.

22. The apparatus as set forth in claim 21 wherein said downcomer further includes a weir secured thereto and wherein said connection member is secured at said second end to said weir.

23. In a chemical process column of the type wherein liquid flows downwardly and vapor ascends upwardly through mixing regions thereof, a downcomer tray assembly incorporating multiple downcomers therein, said assembly comprising:

a first tray hating a first series of downcomers disposed therein;

a second tray disposed beneath said first tray and having a second series of downcomers disposed therein;

said trays being formed with active regions thereon for the ascending flow of vapor therethrough;

a plurality of support baffles secured to said columns and extending across said first and second trays along select ones of said downcomers;

means connecting said downcomer-tray assemblies to said support baffles;

means for supporting the perimeter of said trays relative to said support baffles;

wherein said active area of said tray comprises directional flow valves disposed therein;

wherein said directional flow valves are disposed in aligned rows which are configured to discharge vapor in a direction generally transverse to the liquid flow thereacross; and wherein adjacent rows of said valves discharge said vapor in opposite directions to create opposing flow therebetween and enhance the tray efficiency thereof.

* * * * *